United States Patent [19]

Ogawa et al.

[11] 4,249,914

[45] Feb. 10, 1981

[54] CUTTING TOOL MATERIAL AND METHOD FOR PRODUCING CUTTING TOOL MATERIAL

[75] Inventors: Kazuki Ogawa; Mitsuhiko Furukawa; Yoshimichi Hara; Takashi Kitahira, all of Fukuoka, Japan

[73] Assignee: Nippon Tungsten Co., Ltd., Fukuoka, Japan

[21] Appl. No.: 897,467

[22] Filed: Apr. 18, 1978

[30] Foreign Application Priority Data

Apr. 20, 1977 [JP] Japan .................................. 52-45345

[51] Int. Cl.³ .............................................. B24D 3/04
[52] U.S. Cl. ........................................ 51/309; 106/65; 106/73.4; 106/73.33; 264/66
[58] Field of Search ...................... 106/65, 73.4, 73.33; 51/309, 307; 264/66

[56] References Cited

U.S. PATENT DOCUMENTS

| 3,026,210 | 3/1962 | Coble | 106/65 |
| 3,033,694 | 5/1962 | Trent et al. | 106/65 |
| 3,652,304 | 3/1972 | Daniels | 106/57 |
| 3,705,025 | 12/1972 | Daniels | 264/60 |
| 3,953,221 | 4/1976 | Lange | 106/73.4 |
| 4,022,584 | 5/1977 | Rudy | 106/73.4 |

FOREIGN PATENT DOCUMENTS

| 49-40121 | 10/1974 | Japan | 106/73.4 |
| 50-89410 | 7/1975 | Japan | 106/73.4 |

OTHER PUBLICATIONS

"Isostatically Hot Pressed Hard Metal", in Tooling, Apr. 1974, pp. 13–23.

Boyer et al., ASME Publication titled, "Unique Application of Pressure Equipment for Hot Isostatic Processing", 1970, pp. 1–11.

*Primary Examiner*—Herbert T. Carter
*Attorney, Agent, or Firm*—Jordan and Hamburg

[57] ABSTRACT

The powder mixture consisting of 0.5 to 5 percent by weight of TiN and 99.5 to 95 percent by weight of $Al_2O_3$ is first presintered and is subsequently subjected to a hot isostatic pressing so as to produce a sintered product which has the maximum grain size of 2 μm and the hardness of more than $H_RA$ 94.

Such sintered product is used as a cutting tool for a high-speed continuous cutting operation.

4 Claims, 2 Drawing Figures a  b  c a  b  c a  b  c

CUTTING TOOL MATERIAL AND METHOD FOR PRODUCING CUTTING TOOL MATERIAL

BACKGROUND OF INVENTION

Recently as ceramic material for high-speed cutting tools, a material having $Al_2O_3$ as a major constituent or material which includes less than 1 percent by weight of a grain growth inhibitor replacing a corresponding percentage of the above $Al_2O_3$ has been commonly used.

The present invention relates to a material produced by adding TiN to such $Al_2O_3$ which has improved wear resistance and thermal shock resistance in high-speed cutting and a method for producing the material.

Based on the result of the study that TiN has low affinity with metal and has favorable heat conductivity, the inventors have found that a material to which TiN is added increases the wear resistance and thermal shock resistance when the material is used as a cutting tool.

However, when the material is produced by a conventional hot pressing sintering method, unfavorable phenomena such as the reaction between a carbon mold and TiN occur. Furthermore, such method requires an extremely high sintering temperature so that the grain size of the sintered body inevitably becomes excessively large. Still furthermore, the sintered body has different physical and mechanical properties between those on a plane perpendicular to the pressing direction and on a plane parallel to the pressing direction. Namely, anisotropy occurs among constituent grains so that such conventional method has hardly succeeded in obtaining material having favorable properties such as high strength, high wear resistance or high thermal shock resistance.

Accordingly, it is an object of the present invention to provide cutting tool material of improved strength, wear resistance and thermal shock resistance.

It is another object of the present invention to provide a cutting tool material which is most suitable for a high-speed continuous cutting operation.

It is a further object of the present invention to provide a method for producing such material by determining the optimal composition of raw material or powder mixture and the optimal producing conditions such as temperature or pressure.

BRIEF DESCRIPTION OF DRAWINGS

FIG. 1 and FIG. 2 are X-ray refraction charts of the test piece No. 8 of Table 1 wherein FIG. 1 is the chart taken on a plane perpendicular to the pressing direction and FIG. 2 is the chart taken on a plane parallel to the pressing direction.

DETAILED DESCRIPTION OF DISCLOSURE

Figure 1:
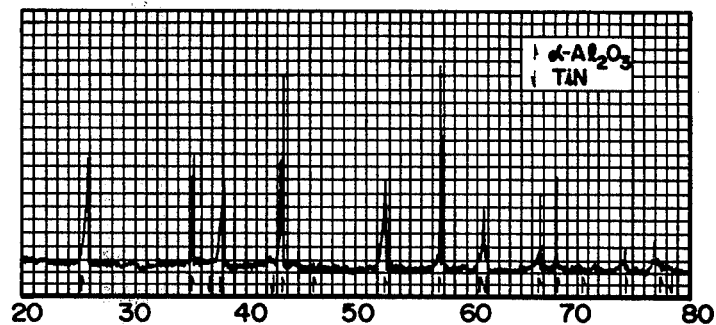

The present invention provides a method for producing such material by determining the optimal composition of material and the optimal producing conditions such as temperature.

This invention substantially discloses a cutting tool material characterized in that the final composition thereof consists of 0.5 to 5 percent by weight of TiN and 99.5 to 95 percent by weight of $Al_2O_3$ and that maximum grain size and hardness thereof are less than 2 $\mu m$ and more than $H_RA$ 94 respectively.

The above cutting tool material is substantially made or produced by the following steps;

(i) preparing a powder mixture by raw material powder consisting of 0.5 to 5 percent by weight of TiN and 99.5 to 95 percent by weight of $Al_2O_3$, $Al_2O_3$ and TiN having the average grain size of less than 1 $\mu m$ (ii) forming said powder mixture into green compacts by compressing said mixture at a desired pressure.

(iii) presintering said powder mixture in a vacuum at 1500° C. until the relative density of the mixture become more than 95 percent, and (iv) subjecting the presintered mixture to a hot isostatic pressing (hereinafter called H.I.P.) for 30 to 60 minutes at 1400°–1450° C. under a gas pressure of 1300 to 2000 $kg/cm^2$.

In the above composition of the material, less than 1 percent by weight of $Al_2O_3$ may be replaced by a corresponding percentage of MgO which works as a grain growth inhibitor in the sintered body. MgO may be added in a suitable manner such that; (1) it is added in a form of MgO powder, or (2) it is added in a form of $MgNO_3$ and subsequently is roasted.

It has been found in the course of invention that a cutting tool material which includes 0.5 to 5 percent by weight of TiN is suitable for a high-speed continuous cutting operation.

Accordingly, the following experiment which determined the physical and mechanical properties of the cutting tool material of this invention was conducted on the cutting tool materials.

EXPERIMENT

This experiment is characterized in that the cutting tool material, as a final composition, consists of 0.5 to 5 percent by weight of TiN and 99.5 percent by weight of $Al_2O_3$.

(A) Manner of Operation $\alpha$(alpha)-$Al_2O_3$ (purity: 99.9%, average grain size: 0.6 $\mu m$) and TiN and MgO (purity: 99%, average grain size: 1 $\mu m$) were mixed together at various mixing ratios shown in Table 1 and the mixture was pelletized or granulated with the addition of a suitable wax, such as paraffin or polyvinyl alcohol. Next the mixture was pressed at a pressure of 1000 $kg/cm^2$ such that cutting tool tip of final composition which is produced by the sintering (described later) has the size of 12.7 mm × 12.7 mm × 4.8 mm. With the above compressing operation, the powder mixture was formed into a green compact. These green compacts were presintered in a vacuum either at 1480° C. for 90 minutes or at 1520° C. for 90 minutes or at 1550° C. for 60 minutes. After the above presintering operation, the presintered tip bodies were placed in the H.I.P. heating furnace which is substantially a high pressure vessel provided with a Mo(Molybdenum) heater. In the furnace, the cutting tool tip bodies were applied with an isostatic pressure of 1800 $kg/cm^2$ and at a furnace temperature of 1440° C. After sintering the tip bodies for 60 minutes in the above manner, the sintered products of final composition were obtained.

These sintered products were subject to the continuous cutting test (lathe cutting test).

| (Conditions for lathe cutting operation) | | |
|---|---|---|
| Workpiece: | Niclel Chrome Molybdenum Steel | |
| Insert: | SNG 432 type tip (12.7 × 12.7 × 4.8 mm) | |
| Cutting conditions | (I) | (II) |
| Cutting speed: | 600 m/min | 350 m/min |
| Feed: | 0.1 mm/rev | 0.1 mm/rev |
| Depth of Cut: | 1.0 mm | 1.0 mm |
| Lathe used in test: | Made by Seibu Denki Co., Ltd. | |

*In each cutting condition (I) or (II), the workpiece was cut for 3 minutes and 10 minutes.

(B) Result of Experiment

Such result is shown in Table 1.

TABLE 1

| test piece No. | mixing ratio (% by weight) Al$_2$O$_3$ | TiN | presintering temperature (°C.) | presintering relative density (%) | presintering average grain size (μm) | H.I.P. sintering relative density (%) | H.I.P. sintering average grain size (μm) | hardness (H$_R$A) | cutting test 350 m/min flank wear(mm) 3 minutes | 10 minutes | tip nose | cutting test 600 m/min flank wear(mm) 3 minutes | 10 minutes | tip nose |
|---|---|---|---|---|---|---|---|---|---|---|---|---|---|---|
| 1 | 100 | 0 | 1480 | 98.6 | 2.0 | 99.9 | 2.0 | 94.1 | 0.10 | 0.20 | * | 0.07 | 0.21 | * |
|  |  |  | 1520 | 98.5 | 4.0 | 99.9 | 4.0 | 92.0 |  |  |  |  |  |  |
| 2 | 99.8 | 0.2 | 1480 | 98.2 | 2.0 | 99.9 | 2.0 | 94.1 | 0.08 | 0.19 | * | 0.08 | 0.21 | * |
|  |  |  | 1520 | 98.4 | 3.8 | 99.9 | 3.8 | 92.8 |  |  |  |  |  |  |
| 3 | 99.6 | 0.4 | 1480 | 97.8 | 1.9 | 99.9 | 1.9 | 94.1 | 0.06 | 0.19 | ** | 0.07 | 0.21 | * |
|  |  |  | 1520 | 98.3 | 3.8 | 99.9 | 3.8 | 92.9 |  |  |  |  |  |  |
| 4 | 99.5 | 0.5 | 1480 | 97.8 | 1.9 | 99.9 | 1.9 | 94.0 | 0.05 | 0.15 | *** | 0.07 | 0.20 | ** |
|  |  |  | 1520 | 98.5 | 3.8 | 99.9 | 3.8 | 93.2 |  |  |  |  |  |  |
| 5 | 99.4 | 0.6 | 1480 | 97.9 | 1.8 | 99.9 | 1.8 | 94.1 | 0.05 | 0.13 | *** | 0.07 | 0.19 | *** |
|  |  |  | 1520 | 98.3 | 3.8 | 99.9 | 3.8 | 93.1 | 0.09 | 0.19 | *** | 0.09 | 0.21 | *** |
| 6 | 99.0 | 1.0 | 1480 | 97.4 | 1.9 | 99.9 | 1.9 | 94.2 | 0.05 | 0.12 | *** | 0.07 | 0.19 | *** |
|  |  |  | 1520 | 98.3 | 3.8 | 99.9 | 3.8 | 93.2 |  |  |  |  |  |  |
| 7 | 98.5 | 1.5 | 1480 | 97.3 | 2.0 | 99.9 | 2.0 | 94.1 | 0.05 | 0.13 | *** | 0.07 | 0.19 | *** |
|  |  |  | 1520 | 98.2 | 4.0 | 99.9 | 4.0 | 92.2 |  |  |  |  |  |  |
| 8 | 98.0 | 2.0 | 1480 | 97.0 | 2.0 | 99.9 | 2.0 | 94.2 | 0.05 | 0.12 | *** | 0.07 | 0.19 | *** |
|  |  |  | 1550 | 98.0 | 4.9 | 99.9 | 4.9 | 92.8 |  |  |  |  |  |  |
| 9 | 96.5 | 3.5 | 1480 | 96.5 | 2.0 | 99.9 | 2.0 | 94.1 | 0.05 | 0.12 | *** | 0.07 | 0.19 | *** |
|  |  |  | 1550 | 98.0 | 3.9 | 99.9 | 3.9 | 92.6 |  |  |  |  |  |  |
| 10 | 95.5 | 4.5 | 1480 | 96.7 | 1.9 | 99.9 | 1.9 | 94.1 | 0.05 | 0.12 | *** | 0.07 | 0.18 | *** |
|  |  |  | 1550 | 97.9 | 4.0 | 99.9 | 4.0 | 92.5 |  |  |  |  |  |  |
| 11 | 95.0 | 5.0 | 1480 | 96.5 | 1.9 | 99.9 | 1.9 | 94.1 | 0.06 | 0.12 | *** | 0.07 | 0.18 | *** |
|  |  |  | 1550 | 97.8 | 4.0 | 99.9 | 4.0 | 92.5 |  |  |  |  |  |  |
| 12 | 94.0 | 6.0 | 1480 | 96.3 | 1.9 | 99.9 | 1.9 | 94.0 | 0.08 | 0.17 | *** | 0.10 | 0.20 | *** |
|  |  |  | 1550 | 97.8 | 4.5 | 99.9 | 4.5 | 92.6 |  |  |  |  |  |  |
| 13 | 90.0 | 10.0 | 1480 | 96.1 | 1.9 | 99.9 | 1.9 | 94.0 | 0.08 | 0.17 | *** | 0.10 | 0.21 | *** |
|  |  |  | 1550 | 97.2 | 4.9 | 99.9 | 4.9 | 92.6 |  |  |  |  |  |  |

*chipping occurred
**chipping slightly occurred
***normal wear

Figure 2:
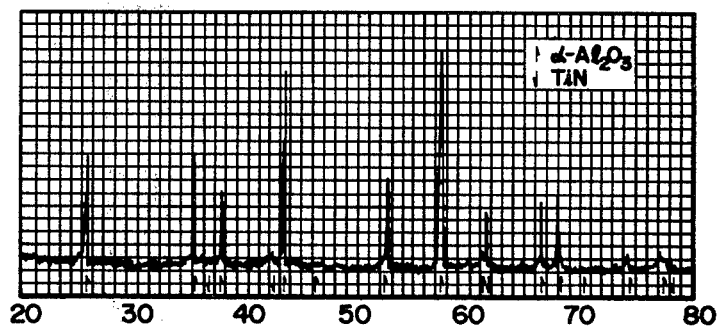
Figure 6:
Figure 3:
Figure 3:
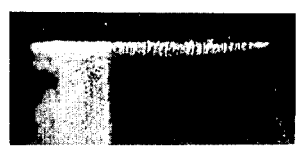
Figure 3:
Figure 4:
Figure 4:
Figure 4:
Figure 5:
Figure 5:
Figure 5:

The result of the X-ray refraction analysis of the test piece No. 8 is shown in FIG. 1 and FIG. 2.

The following evaluations can be obtained from the results shown in Table 1.

(i) With respect to the test piece No. 1 and No. 3 having 0 percent and 0.4 percent by weight of TiN respectively, the test pieces showed chipping even at an optimal presintering operation of 1480° C. and 90 minutes.

This implies that the test piece could not improve the heat resistance thereof since the TiN amount was zero or too low.

With respect to the test pieces No. 4 to No. 11, having gradually increasing TiN amounts relative to that of the test pieces No. 1 to 3, the test pieces, after being treated by the above optimal presintering (1480° C. and 90 minutes), showed favorable results. However, when the TiN amount was increased up to 6.0 percent by weight (see test pieces No. 12 and No. 13), they showed the wide flank wear width even after treatment by the above optimal presintering of 1480° C.×90 minutes and therefore are not suitable for fine cutting or tooling.

Furthermore, test pieces No. 12 and No. 13 which had presintering of 1550° C. and 60 minutes had low hardness of H$_R$A 92.6 and therefore they were not suitable as cutting material.

(ii) Presintering was effected on each test piece at three different temperatures 1480° C., 1520° C. and 1550° C. In all the test pieces, the final products at 1520° C. and 1550° C. had coarse average grain size and accordingly they had insufficient hardness whereas the final products at 1480° C. had the fine grain size (maximum size being 2 μm) and accordingly they had sufficient hardness.

(iii) When the relative density of the test piece, after the presintering operation, was less than 95 percent, the final products showed insufficient relative density after HIP treatment and accordingly the products could not have the sufficient hardness. Generally speaking, most of the pores of a sintered body produced solely with Al$_2$O$_3$ appear in the form of "closed pores" when the relative density after the presintering is more than 93 percent.

In this experiment, it is considered that since the test piece includes TiN, the affinity among grains is worse than that of sintered body solely produced with Al$_2$O$_3$. Namely, the pores of the sintered body are not formed into complete "closed pores".

From the above results and evaluation of the tests, it is found that in the high-speed continuous cutting operation, the TiN amount should preferably be in a range from 0.5 to 5 percent by weight and the constituent grains should be fine enough such that the size thereof is about 2 μm at the maximum. Furthermore, it is also found that unless hardness after H.I.P. sintering is more than H$_R$A 94, the flank wear becomes excessively large so that the hardness after presintering should be more than $H_RA$ 94 for obtaining improved cutting performance than that of the commercially available products.

Furthermore, in view of the results that presintering prevents the growth of constituent grains, the presintering temperature should be restricted and be 1500° C. at maximum while the temperature for subsequent HIP sintering should also be restricted such that it falls within a range of 1400° to 1450° C. due to the same reason as that of the presintering operation.

As can be observed from Table 1, the cutting tool material of this present invention has high hardness and improved wear resistance and substantially has no chipping thereof.

Furthermore, as can be observed from FIG. 1 and FIG. 2, the material produced by the method of this invention has no anisotropy among constituent grains. This implies that the material of this invention has neither mechanical nor physical anisotropy therein and accordingly the material shows improved performance when used as cutting tool material.

What we claim is:

1. A method for producing a cutting tool material comprising:
   (i) preparing a powder mixture of raw material powder consisting of 0.5 to 5 percent by weight of TiN and 99.5 to 95 percent by weight of $Al_2O_3$, said TiN and $Al_2O_3$ both having a grain size of less than 1 μm,
   (ii) forming said powder mixture into a green compact by compressing said powder mixture,
   (iii) presintering said green compacts in a vacuum at a maximum temperature of 1500° C. until a presintered body having a relative density of more than 95 percent is obtained, and
   (iv) subjecting the presintered body to hot isosatic pressing for 30 to 60 minutes at 1400°–1450° C. under a gas pressure of 1300 to 2000 kg/cm².

2. Cutting tool material consisting of 0.5 to 5 percent by weight of Tin and 99.5 to 95 percent by weight of $Al_2O_3$, and having a maximum grain size of less than 2 μm and a hardness of more than $H_RA$ 94 prepared by the process of claim 1.

3. A method for producing a cutting tool material comprising:
   (i) preparing a powder mixture of raw material powder consisting of 0.5 to 5 percent by weight of TiN, more than 0 but less than 1 percent by weight MgO, and the balance $Al_2O_3$, said TiN and $Al_2O_3$ both having a grain size of less than 1 μm,
   (ii) forming said powder mixture into a green compact by compressing said powder mixture,
   (iii) presintering said green compacts in a vacuum at a maximum temperature of 1500° C. until a presintered body having a relative density of more than 95 percent is obtained, and
   (iv) subjecting the presintered body to hot isosatic pressing for 30 to 60 minutes at 1400°–1450° C. under a gas pressure of 1300 to 2000 kg/cm².

4. Cutting tool material consisting of 0.5 to 5 percent by weight of TiN, more than 0 but less than 1 percent by weight of MgO, and the balance $Al_2O_3$, and having a maximum grain size of less than 2 μM and a hardness of more than $H_RA$ 94 prepared by the process of claim 3.

* * * * *